United States Patent [19]

Scholz

[11] Patent Number: 5,502,408

[45] Date of Patent: Mar. 26, 1996

[54] CIRCUIT FOR DECODING 2T ENCODED BINARY SIGNALS

[75] Inventor: Werner Scholz, Gehrden, Germany

[73] Assignee: Deutsche Thomson-Brandt GmbH, Villengen-Schwenningen, Germany

[21] Appl. No.: 356,076

[22] Filed: Dec. 14, 1994

[30] Foreign Application Priority Data

Dec. 17, 1993 [DE] Germany ............... 43 43 252.2

[51] Int. Cl.$^6$ .................................... G11C 8/00
[52] U.S. Cl. .............. 326/105; 377/73; 377/75; 360/51; 341/50; 341/94
[58] Field of Search ................ 326/105, 21; 360/48, 360/51; 341/50, 94; 377/70, 73, 75

[56] References Cited

U.S. PATENT DOCUMENTS

| | | | |
|---|---|---|---|
| 4,055,727 | 10/1977 | Katoh ........................... | 178/68 |
| 4,594,703 | 6/1986 | Tomisawa et al. ............. | 360/51 |
| 4,675,884 | 6/1987 | Nakamura et al. ............. | 360/48 |
| 4,837,790 | 6/1989 | Harada .......................... | 341/50 |
| 5,111,486 | 5/1992 | Oliboni et al. ................. | 360/51 |

FOREIGN PATENT DOCUMENTS 0304081  2/1989  European Pat. Off. .

Primary Examiner—Edward P. Westin
Assistant Examiner—Jon Santamauro
Attorney, Agent, or Firm—Joseph S. Tripoli; Joseph J. Laks; Harvey D. Fried

[57] ABSTRACT

A decoding circuit for 2T encoded binary signals, comprises: a data input terminal; a first D-type flip flop having an input coupled to the input terminal; a first exclusive OR gate having inputs coupled to the input terminal and an output of the first D-type flip flop; a shift register having an input coupled to an output of the exclusive OR gate; a second D-type flip flop having an input coupled to the shift register; and, a second exclusive OR gate having inputs coupled to an output of the second D-type flip flop and to a tap of the shift register, the second exclusive OR gate having an output at which decoded input signals are reconstituted. The second D-type flip flop may be a constituent stage of the shift register, the inputs of the second exclusive OR gate being coupled to adjacent taps of the shift register. At least one of the adjacent taps is the output of the constituent stage formed by the second D-type flip flop. A gate arrangement is coupled to a plurality of taps of the shift register for decoding a predetermined bit pattern in the input signal, for example, a synchronizing component of a digitally recorded video signal played back to the data input terminal. The consecutive taps of the shift register are chosen for equalizing a delay time between detection of the synchronizing component and the reconstituted video signal.

14 Claims, 2 Drawing Sheets

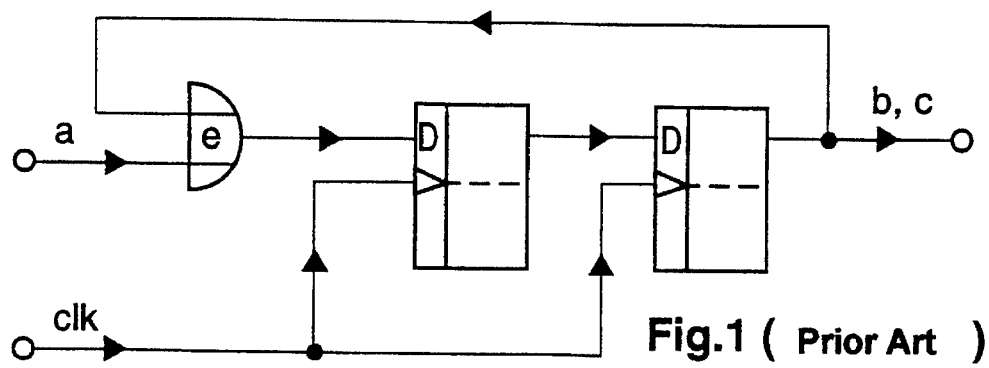
Fig.1 ( Prior Art )
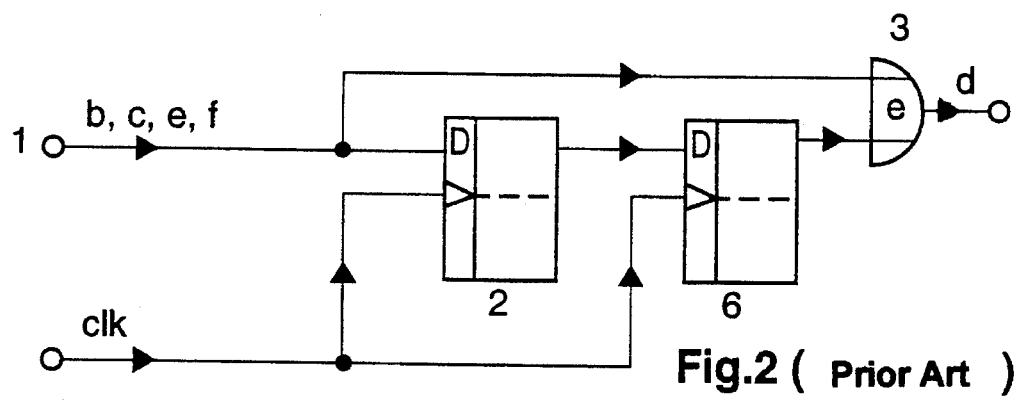
Fig.2 ( Prior Art )
| a | 0 | 0 | 1 | 1 | 0 | 0 | 1 | 1 | 0 | 0 | 0 | 0 | 1 | 1 | 0 | 0 | 0 | 1 |
|---|---|---|---|---|---|---|---|---|---|---|---|---|---|---|---|---|---|---|
| b | 0 | 0 | 1 | 1 | 1 | 1 | 0 | 0 | 0 | 0 | 0 | 0 | 1 | 1 | 1 | 1 | 1 | 0 |
| c | 1 | 1 | 0 | 0 | 0 | 0 | 1 | 1 | 1 | 1 | 1 | 0 | 0 | 0 | 0 | 0 | 0 | 1 |
| d | x | x | 1 | 1 | 0 | 0 | 1 | 1 | 0 | 0 | 0 | 0 | 1 | 1 | 0 | 0 | 0 | 1 |
| e | 0 | 1 | 1 | 0 | 1 | 0 | 0 | 1 | 0 | 1 | 0 | 1 | 0 | 0 | 1 | 0 | 1 | 1 |
| f | 1 | 0 | 0 | 1 | 0 | 1 | 1 | 0 | 1 | 0 | 1 | 0 | 1 | 1 | 0 | 1 | 0 | 0 |
| g | x | 0 | 1 | 0 | 0 | 0 | 1 | 0 | 0 | 0 | 0 | 0 | 1 | 0 | 0 | 0 | 0 | 1 |
Fig.3

CIRCUIT FOR DECODING 2T ENCODED BINARY SIGNALS

BACKGROUND OF THE INVENTION

1. Field of the Invention

The invention relates generally to the field of 2T decoders, and in particular, to a 2T decoder for a synchronizing signal in a digital video recording and playback environment.

2. Description of Related Art

In the recording of signals and data, high storage density is desirable in order to accommodate the largest possible amount of signals, or data, in a predetermined storage area. This is particularly true for digital video recording. One means for increasing the effective storage density is the use of recording codes with the lowest possible redundancy. Nevertheless, strong low-frequency spectral components and large run length values must be accepted. During the reproduction of such signals from a magnetic tape, the partial-response Class IV equalization (PR4) is most commonly used today, in conjunction with a maximum-likelihood detector, for example of the Viterbi type. Together with the PR4 channel, this method of detection supplies a binary signal which is systematically changed as compared with the recording. The recorded bit pattern can be restored with the prior art circuit shown in FIG. 1. Since this is a recursive circuit, a single wrong bit leads to an infinite error propagation. It is therefore customary to use the circuit shown in FIG. 1 with an exclusive or (EXOR) gate and two D-type flip flops as encoders (2T encoders). Use of the symbol T herein means the duration of the period of the bit clock signal (clk). As a result, the recorded bit pattern is changed in such a way that the original bit pattern is produced at the output of the PR4 channel.

When equalization and detection circuits which supply the recorded signal are used in the reproduction of a signal recorded with 2T precoding, the precoding must be subsequently canceled by means of another circuit, such as the prior art circuit shown in FIG. 2. The circuit of FIG. 2 utilizes an EXOR gate 3 and two D-type flip flops 2, 6. Regeneration circuits such as that shown in FIG. 2, which are suitable for low-redundancy recordings and supply the recorded signal are described, for example, in DE OS 41 12 856.

Since the error propagation of the circuit shown in FIG. 2 is restricted to 2 bits, its use on the reproduction side is permissible. One disadvantage of the circuit is that the bit pattern recognition at the output of the circuit is not unambiguous. In other words, various bit patterns at the input of the circuit can generate the sought-after bit pattern at the output of the circuit. During recording, for example, the bit pattern of FIG. 3a generates the bit patterns of FIG. 3b or FIG. 3c at the output of the 2T encoder shown in FIG. 1, if the two flip flops of the encoder are in each case set to 0,0 or 1,1 at the beginning of the bit pattern. The signals of FIG. 3b and FIG. 3c are, for example, the agreed synchronization pattern of the recorded signal. The bit patterns of both FIGS. 3b and 3c produce the bit pattern of FIG. 3d at the output of the circuit shown in FIG. 2, which agrees with the original bit pattern of FIG. 3a, apart from 2 bits. However, the bit pattern of FIG. 3d is also generated by the bit patterns of FIG. 3e and FIG. 3f. This can lead to problems in the block synchronization of the reproduced signal.

SUMMARY OF THE INVENTION

The invention is based on the object of creating a decoding circuit for 2T encoded signals which is as simple as possible and in which the problem of ambiguity in bit pattern recognition is avoided. This object is achieved by a decoding circuit for encoded binary signals, for example 2T encoded binary signals, comprising: a data input terminal; a first D-type flip flop having an input coupled to the input terminal; a first exclusive OR gate having one input coupled to the input terminal and another input coupled to an output of the first D-type flip flop; a shift register having an input coupled to an output of the exclusive OR gate; a second D-type flip flop having an input coupled to the shift register; and, a second exclusive OR gate having one input coupled to an output of the second D-type flip flop and another input coupled to a tap of the shift register, the second exclusive OR gate having an output at which decoded input signals are reconstituted.

In a particularly advantageous arrangement, the second D-type flip flop is a constituent stage of the shift register. In this arrangement, the one and another inputs of the second exclusive OR gate are coupled to adjacent taps of the shift register, at least one of the adjacent taps originating as the output of the constituent stage formed by the second D-type flip flop.

A gate arrangement may be coupled to a plurality of taps of the s shift register for decoding a predetermined bit pattern in the input signal, for example, a synchronizing component of a digitally recorded video signal played back to the data input terminal. The consecutive taps of the shift register are chosen for equalizing a delay time between detection of the synchronizing component and the reconstituted video signal.

An inventive arrangement may also be thought of as resulting from a division of the prior art circuit of FIG. 2 into a first circuit and a second circuit, each of which comprises one D-type flip flop and one exclusive OR gate. The first circuit is located at the input of a shift register already required for bit pattern recognition and the second circuit is connected to an output tap of the shift register or an extension of the shift register. An extension of the shift register refers to additional constituent stages, beyond the number of stages required for the bit pattern recognition. The D-type flip flop of the second circuit can be formed by a D-type flip flop of the shift register. The shift register, or the extension thereof, can also be used for delay equalization between generation of a signal indicative of detection of the bit pattern and the reconstituted input signal.

BRIEF DESCRIPTION OF THE DRAWINGS

FIG. 1 is a block diagram of a 2T encoder circuit, according to the prior art.

FIG. 2 is a block diagram of a 2T decoder circuit, according to the prior art.

FIGS. 3 shows digital bit stream signals useful for o explaining the operation of the circuits in FIGS. 1, 2 and 4.

DETAILED DESCRIPTION OF THE PREFERRED EMBODIMENTS

Figure 4:
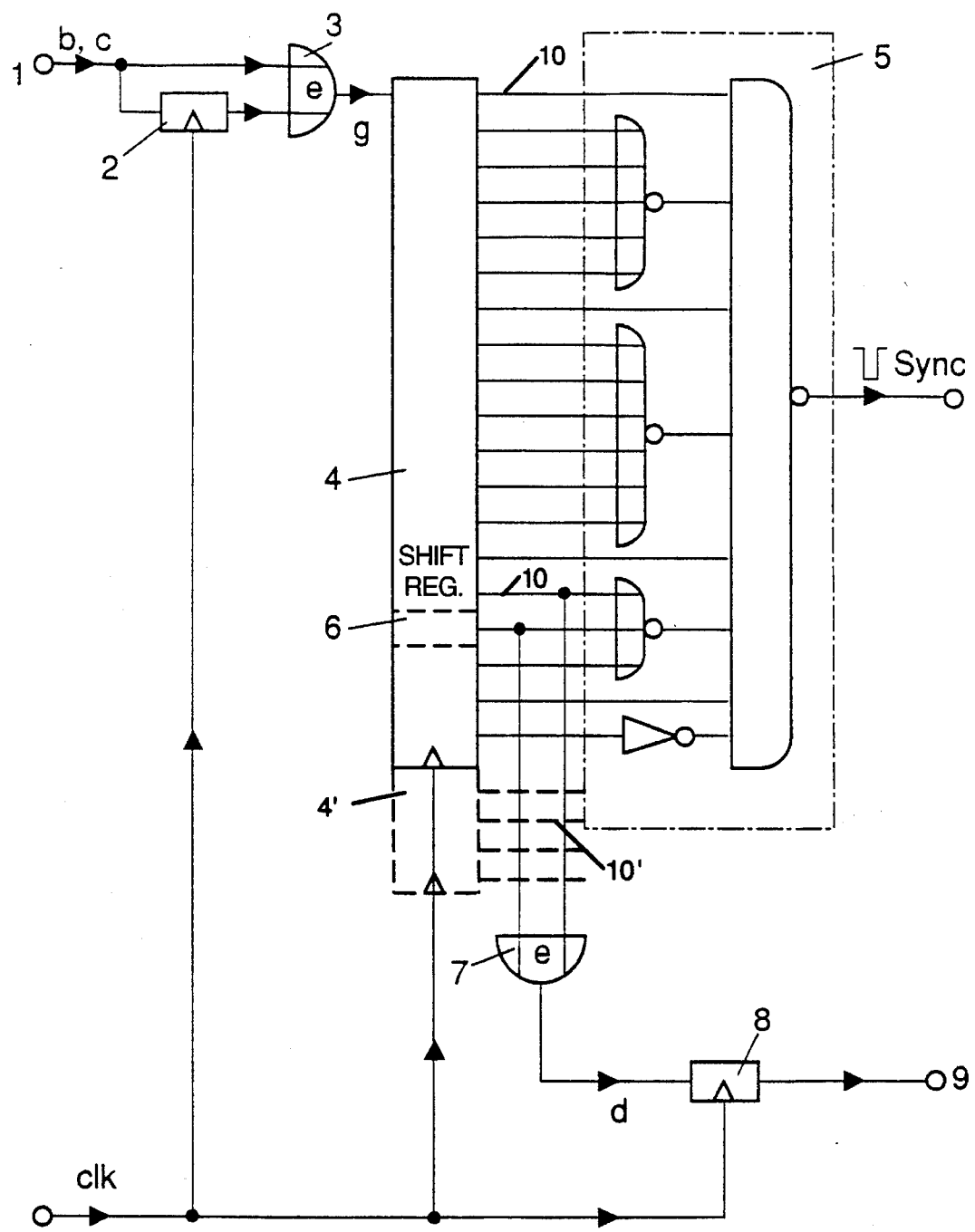
FIG. 4 is a block diagram of a 2T decoder circuit according to an inventive arrangement, shown with a shift register and bit pattern recognition circuit.

With reference to FIG. 4 illustrates an embodiment of a 2T decoder circuit according to an inventive arrangement. An input terminal 1 receives a 2T encoded signal, such as the bit patterns of FIGS. 3b and 3c. Terminal 1 is connected to the D input of a D-type flip flop 2 and one input of an EXOR gate 3. The Q output of the D-type flip flop 2 is another input to the EXOR gate 3. The EXOR gate 3 generates at it output a signal corresponding to the bit pattern of FIG. 3g in response to the inputs of signals corresponding to the bit patterns of FIGS. 3b and 3c. The bit pattern of FIG. 3g, in contrast to the bit pattern of FIG. 3d, unambiguously identifies the bit patterns of FIGS. 3b or 3c, which represent the agreed synchronization pattern of the recorded signal.

A shift register 4 and a gate arrangement 5 are arranged for detecting the bit pattern of FIG. 3g. The output of gate arrangement 5 is a synchronizing signal. A second EXOR gate 7 has it inputs connected to two adjacent ones of the taps 10 of the shift register 4. The EXOR gate 7 supplies at its output the original not encoded signal corresponding to the bit pattern of FIG. 3a and, respectively, FIG. 3d. The output of EXOR gate 7 is an input to a delay matching element 8, which is shown as a flip flop. The output of the flip flop 8 is connected to an output terminal 9.

Flip flop 2, shift register 4 and the flip flops therein, and flip flop 8 are each clocked with the bit clock signal clk. By selecting the taps for the EXOR gate 7, the delay time of the signal at the output terminal 9 can be matched to the time of the occurrence of the synchronization pulse at the output of the gate circuit 5.

Delay matching can also be accomplished in other ways. One alternative is to extend shift register 4 so as to have more stages and taps, represented by the dashed line extension of shift register 4, which is denoted by reference numeral 4'. The additional taps are denoted by reference numeral 10'. Another alternative is to replace flip flop 8 with another shift register.

Dividing the circuit according to FIG. 2, which is required in any event for canceling the 2T precoding, not only enables the unambiguous detectability of the recorded synchronization patterns of FIGS. 3b and 3c, but also makes it possible to utilize the shift register 4, required in any event for pattern recognition, for equalizing the delay of the decoded signal. The resulting circuit provides reliable detection of 2T encoded signals with a minimum amount of hardware in addition to the hardware which is otherwise required.

What is claimed is:

1. A decoding circuit for encoded binary signals, comprising:

a data input terminal;

a first D-type flip flop having an input coupled to said input terminal;

a first exclusive OR gate having one input coupled to said input terminal and another input coupled to an output of said first D-type flip flop;

a shift register having an input coupled to an output of said exclusive OR gate;

a second D-type flip flop having an input coupled to said shift register; and, a second exclusive OR gate having one input coupled to an output of said second D-type flip flop and another input coupled to a tap of said shift register, said second exclusive OR gate having an output at which decoded input signals are reconstituted.

2. The circuit of claim 1, wherein said data input terminal is coupled to a source of 2T encoded binary signals.

3. The circuit of claim 1, wherein said second D-type flip flop is a constituent stage of said shift register.

4. The circuit of claim 3, wherein said data input terminal is coupled to a source of 2T encoded binary signals.

5. The circuit of claim 3, wherein said one and another inputs of said second exclusive OR gate are coupled to adjacent taps of said shift register, at least one of said adjacent taps originating as said output of said constituent stage formed by said second D-type flip flop.

6. The circuit of claim 5, wherein said consecutive taps of said shift register are chosen for equalizing a delay time for said reconstituted signal.

7. The circuit of claim 6, wherein said data input terminal is coupled to a source of 2T encoded binary signals.

8. The circuit of claim 1, further comprising a gate arrangement coupled to a plurality of taps of said shift register for decoding a predetermined bit pattern in said input signal.

9. The circuit of claim 8, wherein said data input terminal is coupled to a source of 2T encoded binary signals.

10. The circuit of claim 5, further comprising a gate arrangement coupled to a plurality of taps of said shift register for decoding a predetermined bit pattern in said input signal.

11. The circuit of claim 10, wherein said data input terminal is coupled to a source of 2T encoded binary signals.

12. The circuit of claim 10, wherein said predetermined bit pattern corresponds to a synchronizing component of a digitally recorded video signal played back to said data input terminal.

13. The circuit of claim 12, wherein said consecutive taps of said shift register are chosen for equalizing a delay time between detection of said synchronizing component and said reconstituted video signal.

14. The circuit of claim 13, wherein said data input terminal is coupled to a source of 2T encoded binary signals.

* * * * *